(12) United States Patent
Petrilli, Sr.

(10) Patent No.: US 12,496,540 B1
(45) Date of Patent: Dec. 16, 2025

(54) WATER FILTER HYDRATOR

(71) Applicant: John Petrilli, Sr., Oceanside, NY (US)

(72) Inventor: John Petrilli, Sr., Oceanside, NY (US)

( * ) Notice: Subject to any disclaimer, the term of this patent is extended or adjusted under 35 U.S.C. 154(b) by 397 days.

(21) Appl. No.: 18/103,540

(22) Filed: Jan. 31, 2023

(51) Int. Cl.
  *B01D 35/30* (2006.01)
  *B01D 29/11* (2006.01)
  *B01D 29/92* (2006.01)
  *C02F 1/00* (2023.01)

(52) U.S. Cl.
  CPC ............ *B01D 35/30* (2013.01); *B01D 29/114* (2013.01); *B01D 29/92* (2013.01); *C02F 1/001* (2013.01); *C02F 2303/04* (2013.01)

(58) Field of Classification Search
  CPC ...... B01D 35/30; B01D 29/114; B01D 29/92; C02F 1/001; C02F 2303/04
  USPC ....... 210/464, 473, 474, 477, 479, 244, 248, 210/253, 257.1, 262, 282, 41, 6.3, 439, 210/441, 445, 449, 451, 455, 458
  See application file for complete search history.

(56) References Cited

U.S. PATENT DOCUMENTS

| | | |
|---|---|---|
| 4,309,289 A | 1/1982 | Head |
| 5,008,011 A | 4/1991 | Underwood |
| 5,104,537 A | 4/1992 | Stifelman |
| 5,454,945 A | 10/1995 | Spearman |
| 5,562,824 A * | 10/1996 | Magnusson ............ C02F 1/003 210/290 |
| 6,866,700 B2 | 3/2005 | Amann |
| 10,307,697 B2 | 6/2019 | Savoy |
| D905,198 S | 12/2020 | Kemmer |

FOREIGN PATENT DOCUMENTS

CA          1093478      1/1981

* cited by examiner

*Primary Examiner* — Madeline Gonzalez

(57) ABSTRACT

The water filter hydrator is a filter component. The water filter hydrator is configured for use with water. When installed, the water filter hydrator aids to filter impurities and pathogens out of the water. The water filter hydrator includes a cistern structure and one or more receiving structures. The one or more receiving structures receive and filter the water stored in the cistern structure. Each receiving structure selected from the one or more receiving structures is designed to maintain the saturation of the receiving structure for as long as possible. The saturation of the receiving structure improves the efficiency and the longevity of the filtration apparatus of any selected receiving structure.

6 Claims, 4 Drawing Sheets

WATER FILTER HYDRATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of casings and housings for filters. (B01D46/0002)

Summary of Invention

The water filter hydrator is a filter component. The water filter hydrator is configured for use with water. When installed, the water filter hydrator aids to filter impurities and pathogens out of the water. The water filter hydrator is configured for use with a Berkey® type water filter. The water filter hydrator comprises a cistern structure and one or more receiving structures. The one or more receiving structures receive and filter the water stored in the cistern structure. Each receiving structure selected from the one or more receiving structures is designed to maintain the saturation of the receiving structure for as long as possible. The saturation of the receiving structure improves the efficiency and the longevity of the filtration apparatus of any selected receiving structure.

These together with additional objects, features and advantages of the water filter hydrator will be readily apparent to those of ordinary skill in the art upon reading the following detailed description of the presently preferred, but nonetheless illustrative, embodiments when taken in conjunction with the accompanying drawings.

In this respect, before explaining the current embodiments of the water filter hydrator in detail, it is to be understood that the water filter hydrator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water filter hydrator.

It is therefore important that the claims be regarded as including such equivalent construction insofar as they do not depart from the spirit and scope of the water filter hydrator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
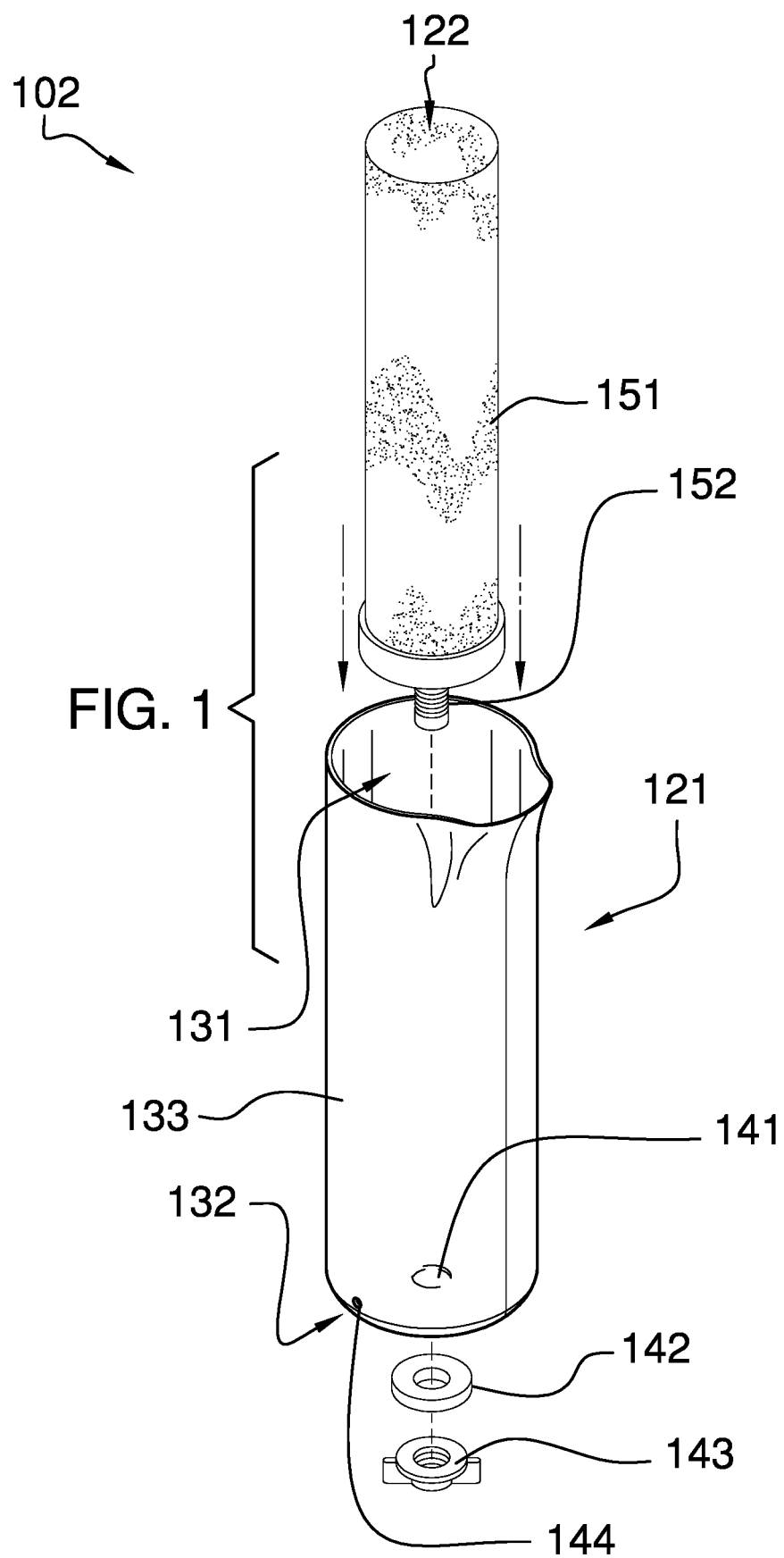
FIG. 1 is a perspective view of an embodiment of the disclosure.
Figure 2:
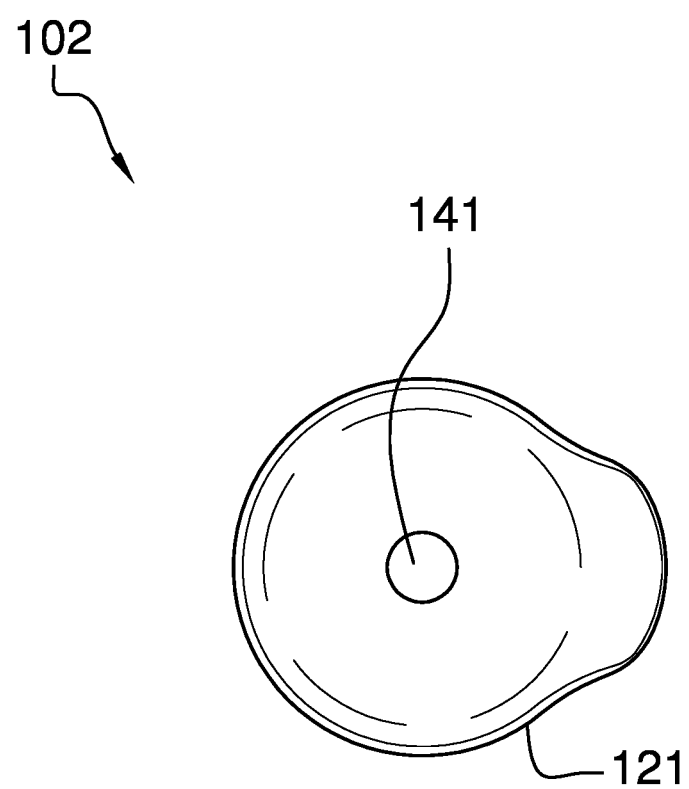
FIG. 2 is a top view of an embodiment of the disclosure.
Figure 3:
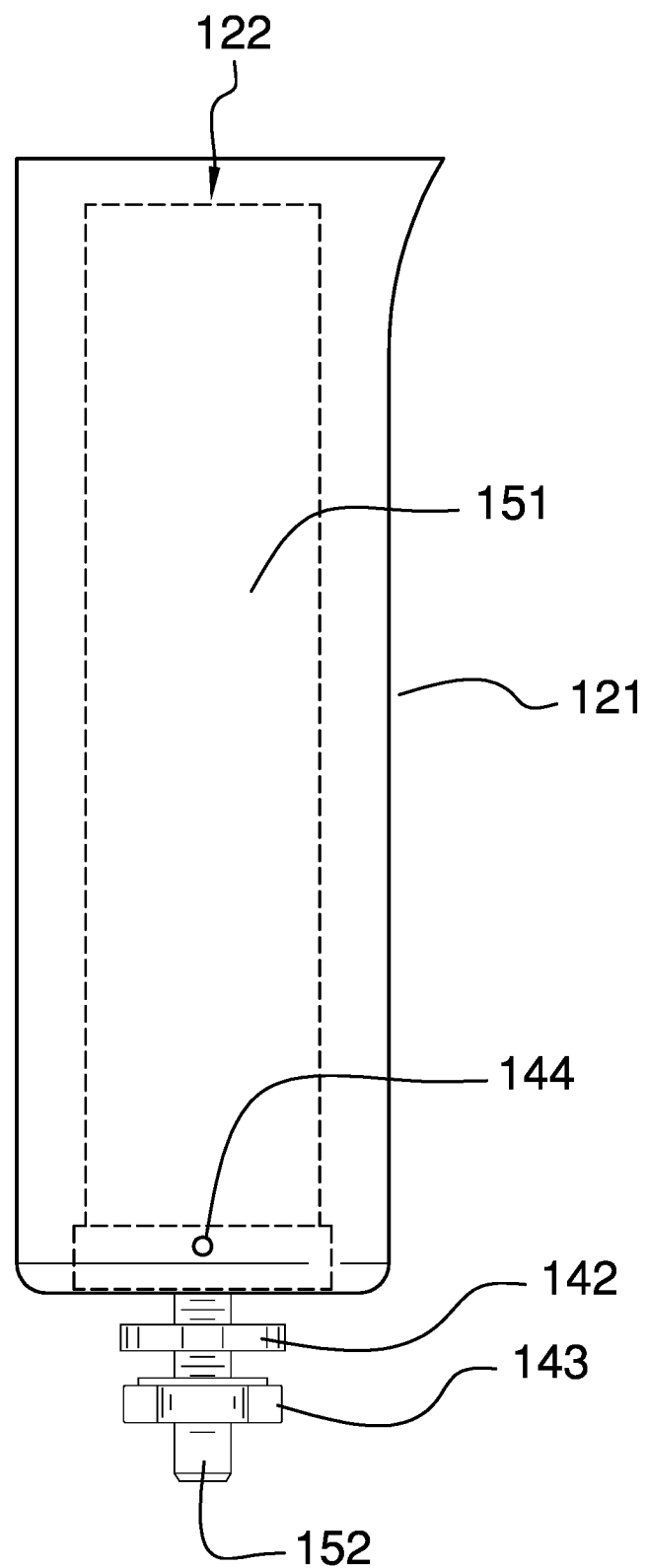
FIG. 3 is a side view of an embodiment of the disclosure.
Figure 4:
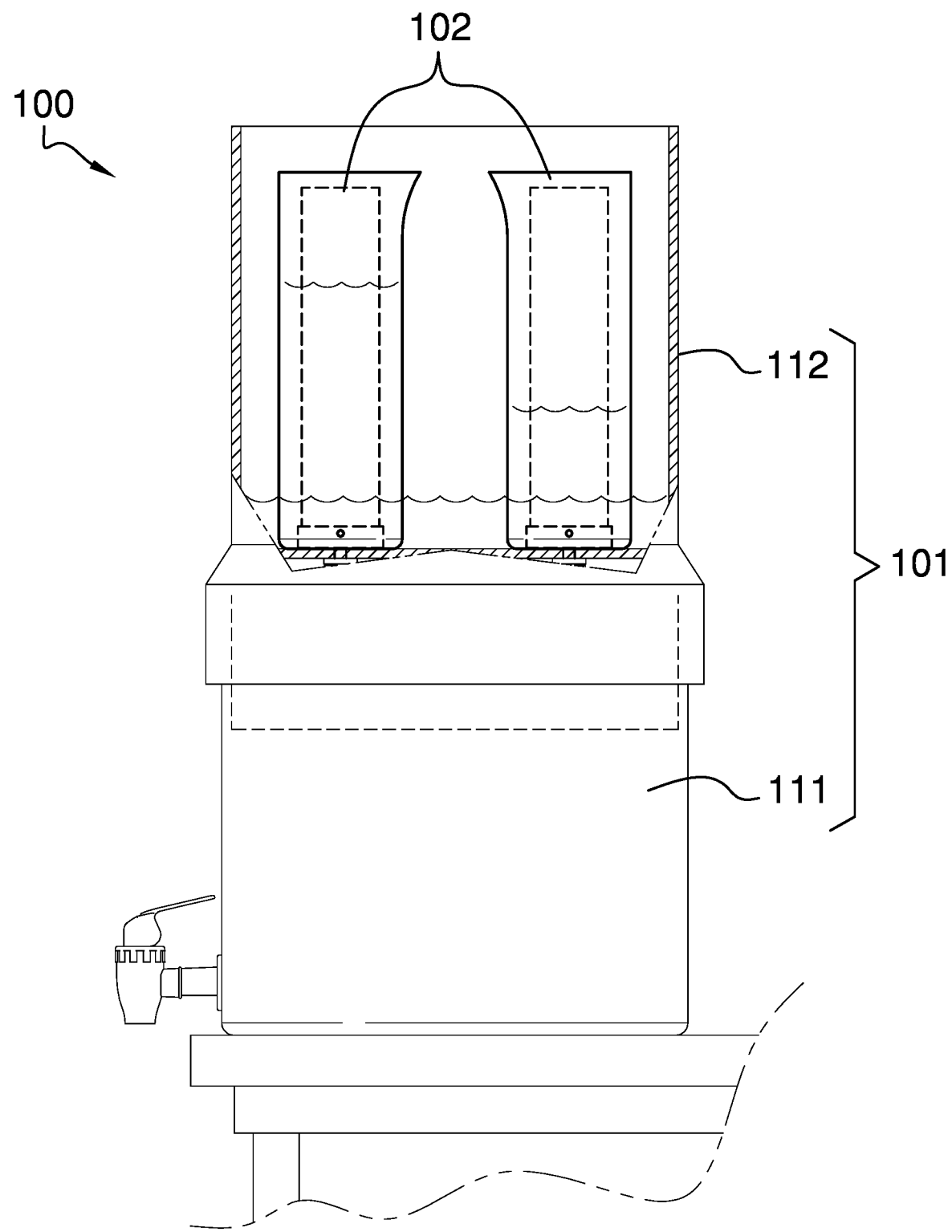
FIG. 4 is an in-use view of an embodiment of the disclosure.

Detailed reference will now be made to one or more potential embodiments of the disclosure, which are illustrated in FIGS. 1 through 4.

The water filter hydrator 100 (hereinafter invention) is a filter that when installed as a unit with a composite filter. The invention 100 is configured for use with water. The invention 100 filters impurities and pathogens out of the water when installed as a unit with a composite filter. The invention is configured for use with a Berkey® type water filter. The invention 100 comprises a cistern structure 101 and one or more receiving structures 102. The one or more receiving structures 102 receive and filter the water stored in the cistern structure 101. Each receiving structure selected from the one or more receiving structures 102 is designed to maintain the saturation of the receiving structure for as long as possible. The saturation of the receiving structure improves the efficiency and the longevity of the filtration apparatus of any selected receiving structure.

The cistern structure 101 forms a container. The cistern structure 101 is a fluid impermeable structure. The cistern structure 101 contains the water stored by the invention 100. The cistern structure 101 contains the one or more receiving structures 102 that filter the water stored by the cistern structure 101. The cistern structure 101 discharges the stored water for consumption. The cistern structure 101 comprises an inferior chamber 111 and a superior chamber 112.

The inferior chamber 111 forms a containment space within the cistern structure 101. The inferior chamber 111 is a fluid impermeable structure. The inferior chamber 111 receives filtered water from the one or more receiving structures 102. The superior chamber 112 gravity feeds the filtered water into the inferior chamber 111. The inferior chamber 111 dispenses the stored water for consumption.

The superior chamber 112 forms a containment space within the cistern structure 101. The superior chamber 112 is a fluid impermeable structure. The inferior chamber 111 receives filtered water from the one or more receiving structures 102. The superior chamber 112 transports the filtered water to the inferior chamber 111. one or more receiving structures 102 gravity feeds the filtered water into the inferior chamber 111. The inferior chamber 111 dispenses the stored water for consumption. The superior chamber 112 is mounted in a superior position relative to the inferior chamber 111.

Each receiving structure selected from the one or more receiving structures 102 is a mechanical structure. Each selected receiving structure receives the water for storage in the cistern structure 101. Each selected receiving structure filters the received water to remove impurities and pathogens. Each selected receiving structure transports the received water into the storage facilities of the cistern structure 101. Each receiving structure selected from the one or more receiving structures 102 is identical. Each selected receiving structure comprises a filter pan structure 121 and a filter structure 122.

The filter pan structure 121 forms a prism structure. The filter pan structure 121 has a pan shape. The filter pan 14 structure 121 is formed from a fluid impermeable material. The filter pan structure 121 is geometrically similar to the filter structure 122. The filter structure 122 inserts into the hollow interior of the filter pan structure 121. The filter structure mechanically attaches to the filter pan structure 121. The 19 filter pan structure 121 receives the water intended for storage within the cistern structure 101. The water contained within the filter pan structure 121 submerges and saturates the filter structure 122. The saturation of the filter structure 122 within the filter pan structure 121 extends the life and improves the efficiency of the filter structure 122. The filter pan structure 121 comprises an open face 131, a closed face 132, and one or more lateral faces 133.

The open face 131 is the open face 131 of the pan shape of the filter pan structure 121. The filter pan structure 121 receives the water through the open face 131.

The closed face 132 is the closed face 132 of the pan shape of the filter pan structure 121. The closed face 132 is the face of the filter pan structure 121 that is distal from the open face 131. The closed face 132 further comprises a drain hole 141, a drain seal 142, and a locking nut 143.

The drain hole 141 is an aperture that is formed through the faces of the closed face 132 of the filter pan structure 121. The locking nut 143 is geometrically similar to the drain pipe of the bed filter 151. The drain pipe 152 inserts through the drain hole 141 through the drain seal 142, and through the hole in the superior chamber 112 as well as the locking nut 143. The locking nut 143 secures the filter structure 122 to the filter pan structure 121.

The drain seal 142 is a fluid impermeable structure that is positioned between the filter pan structure 121 and the superior chamber 112. The drain seal 142 has a ring shape. The drain pipe 152 inserts through the drain hole 141, and through the drain seal 142.

The drain seal 142 forms a fluid impermeable seal around the drain pipe 152, the filter pan structure 121, the superior chamber 112, and the locking nut 143.

The locking nut 143 is a nut. The locking nut 143 attaches to the drain pipe 152 of the bed filter 151. The locking nut 143 screws onto the bed filter 151 at the end of the drain pipe 152 that is distal from the bed filter 151. The locking nut 143 secures the filter structure 122 into a fixed position on the closed face 132 of the filter pan structure 121.

The one or more lateral faces 133 forms the lateral face structure of the filter pan structure 121. The one or more lateral faces 133 forms the vertically oriented containment structure of the filter pan structure 121. The one or more lateral faces 133 is further formed with a leveling port 144.

The leveling port 144 is an aperture that is formed through the faces of the one or more lateral faces 133 of the filter pan structure 121. The leveling port 144 allows water to flow freely between the superior chamber 112 of the cistern structure 101 and the filter pan structure 121 of the one or more receiving structures 102. The leveling port 144 equalizes the water level between the superior chamber 112 and the filter pan structure 121. The leveling port 144 maintains a stock of water dedicated to hydrating the bed filter 151.

The filter structure 122 is a bed filter 151. The filter structure 122 is a fluid permeable structure. The filter structure 122 removes impurities and pathogens from the water that passes through the one or more receiving structures 102. The filter structure 122 absorbs the water contained in the filter pan structure 121. The force of gravity provides the motive force necessary to cause the water to flow through the filter structure 122. The filter structure 122 transports the filtered water. The filter structure 122 discharges the filtered water into the inferior chamber 111 of the cistern structure 101. The filter structure 122 comprises a bed filter 151.

The bed filter 151 forms the physical filter used to filter the water. The bed filter 151 is defined elsewhere in this disclosure. The bed filter 151 further comprises a drain pipe 152. The drain pipe 152 is a pipe. The drain pipe 152 attaches to the inferior end of the bed filter 151. The drain pipe 152 forms a fluid transport structure that transports the water filtered by the bed filter 151 into the inferior chamber 111. The drain pipe 152 is formed with an exterior screw thread. The drain pipe 152 is sized such that the drain pipe 152 screws into the locking nut 143 of the filter pan structure 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drain: As used in this disclosure, a drain is a fitting that is used to remove a fluid from a device.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term roughly geometrically similar is meant that the primary shapes of two objects are geometrically similar except that there are functional items (such as fastening devices) associated with the primary shape may not maintain the ratio for geometric similarity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner dimension.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Seal: As used in this disclosure, a seal is a structure that forms a fluid impermeable barrier between two objects.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A water filter hydrator comprising
a cistern structure and one or more receiving structures;
wherein the water filter hydrator is configured for use with water;
wherein the one or more receiving structures receive and filter a water stored in the cistern structure;
wherein the cistern structure comprises an inferior chamber and a superior chamber;
wherein the superior chamber is mounted in a superior position relative to the inferior chamber;
wherein the inferior chamber forms a containment space within the cistern structure;
wherein the superior chamber forms a containment space within the cistern structure;
wherein each selected receiving structure comprises a filter pan structure and a filter structure;
wherein the filter structure inserts into the filter pan structure;
wherein the filter pan structure receives the water intended for storage within the cistern structure;
wherein the water contained within the filter pan structure submerges and saturates the filter structure;
wherein the saturation of the filter structure within the filter pan structure extends the life and improves the efficiency of the filter structure;
wherein the filter pan structure comprises an open face, a closed face, and one or more lateral faces;
wherein the open face is the open face of the pan shape of the filter pan structure;
wherein the filter pan structure receives the water through the open face;
wherein the closed face is the closed face of the pan shape of the filter pan structure;
wherein the closed face is the face of the filter pan structure that is distal from the open face;
wherein the one or more lateral faces forms a lateral face structure of the filter pan structure;
wherein the one or more lateral faces forms a vertically oriented containment structure of the filter pan structure;
wherein the water filter hydrator filters impurities and pathogens out of the water;
wherein each receiving structure selected from the one or more receiving structures maintains a saturation of the receiving structure;
wherein the cistern structure forms a container;
wherein the cistern structure is a fluid impermeable structure;
wherein the cistern structure contains a water that is stored by the water filter hydrator;
wherein the cistern structure contains the one or more receiving structures that filter the water stored by the cistern structure;
wherein the cistern structure discharges the stored water;
wherein each receiving structure selected from the one or more receiving structures is a mechanical structure;
wherein each selected receiving structure receives the water for storage in the cistern structure;
wherein each selected receiving structure filters the received water to remove impurities and pathogens;
wherein each selected receiving structure transports the received water into storage facilities of the cistern structure;
wherein each receiving structure selected from the one or more receiving structures is identical;
wherein the inferior chamber is a fluid impermeable structure;
wherein the inferior chamber receives filtered water from the one or more receiving structures;
wherein the superior chamber gravity feeds the filtered water into the inferior chamber;
wherein the superior chamber is a fluid impermeable structure;
wherein the superior chamber receives unfiltered water from the one or more receiving structures;
wherein one or more receiving structures gravity feeds the filtered water into the inferior chamber.

2. The water filter hydrator according to claim 1
wherein the filter pan structure has a pan shape;
wherein the filter pan structure is formed from a fluid impermeable material;
wherein the filter pan structure is geometrically similar to the filter structure;
wherein the filter structure inserts into a hollow interior of the filter pan structure;
wherein the filter structure mechanically attaches to the filter pan structure.

3. The water filter hydrator according to claim 2
wherein the filter structure is a fluid permeable structure;
wherein the filter structure removes impurities and pathogens from the water that passes through the one or more receiving structures;
wherein the filter structure absorbs the water contained in the filter pan structure;
wherein the force of gravity provides the motive force necessary to cause the water to flow through the filter structure;
wherein the filter structure transports the filtered water;
wherein the filter structure discharges the filtered water into the inferior chamber of the cistern structure;
wherein the filter structure comprises a bed filter;
wherein the bed filter forms a physical filter used to filter the water.

4. The water filter hydrator according to claim 3
wherein the bed filter further comprises a drain pipe;
wherein the drain pipe is a pipe;
wherein the drain pipe attaches to the inferior end of the bed filter;
wherein the drain pipe forms a fluid transport structure that transports the water filtered by the bed filter into the inferior chamber;
wherein the drain pipe is formed with an exterior screw thread;
wherein the drain pipe is sized such that the drain pipe screws into a locking nut of the filter pan structure.

5. The water filter hydrator according to claim 4
wherein the closed face further comprises a drain hole, a drain seal, and the locking nut;
wherein the drain hole is an aperture that is formed through the faces of the closed face of the filter pan structure;
wherein the drain hole is geometrically similar to the drain pipe of the bed filter;
wherein the drain pipe inserts through the locking nut;

wherein the locking nut secures the filter structure to the filter pan structure and to the superior chamber;

wherein the drain seal is a fluid impermeable structure that is positioned between the filter pan structure and the inferior chamber;

wherein the drain seal has a ring shape;

wherein the drain pipe inserts through the drain seal;

wherein the drain seal forms a fluid impermeable seal around the drain pipe between the filter pan structure and the superior chamber;

wherein the locking nut is a nut;

wherein the locking nut attaches to the drain pipe of the bed filter;

wherein the locking nut screws onto the bed filter at the end of the drain pipe that is distal from the bed filter;

wherein the locking nut secures the filter structure into a fixed position on the closed face of the filter pan structure.

6. The water filter hydrator according to claim 5 wherein the one or more lateral faces is further formed with a leveling port;

wherein the leveling port is an aperture that is formed through the faces of the one or more lateral faces of the filter pan structure;

wherein the leveling port allows water to flow freely between the superior chamber of the cistern structure and the filter pan structure of the one or more receiving structures;

wherein the leveling port equalizes the water level between the superior chamber and the filter pan structure;

wherein the leveling port maintains a stock of water dedicated to hydrating the bed filter.

* * * * *